United States Patent [19]

Aonuma et al.

[11] 4,180,188
[45] Dec. 25, 1979

[54] SEALING STRUCTURE FOR ROTARY VALVES

[75] Inventors: Tatuo Aonuma, Kashiwa; Michio Kiuchi, Nagereyama; Hirozi Watanabe; Takeshi Akao, both of Noda, all of Japan

[73] Assignee: Kokkoman Shoyu Co., Ltd., Noda, Japan

[21] Appl. No.: 740,391

[22] Filed: Nov. 10, 1976

[30] Foreign Application Priority Data

Nov. 18, 1975 [JP] Japan .............................. 50-137794
Dec. 2, 1975 [JP] Japan .............................. 50-160983

[51] Int. Cl.² ........................................... G01F 11/10
[52] U.S. Cl. ................................. 222/368; 277/81 P; 414/219
[58] Field of Search .................. 418/147, 148, 127; 222/368, 370; 277/116, 116.2, 116.4, 116.6, 173, 174, 176, 81 P; 214/17 CC; 414/219, 220, 301

[56] References Cited

U.S. PATENT DOCUMENTS

| 939,911 | 11/1909 | Heimann et al. | 418/255 X |
| 2,858,212 | 10/1958 | Durant et al. | 222/368 X |
| 2,880,045 | 3/1959 | Wankel | 277/174 X |
| 3,139,233 | 6/1964 | Simonsen | 277/81 P X |
| 3,151,784 | 10/1964 | Tailor | 222/368 |
| 3,556,355 | 1/1971 | Ruiz | 222/368 |

Primary Examiner—David A. Scherbel
Attorney, Agent, or Firm—Irving M. Weiner; Pamela S. Burt; Melvin Yedlin

[57] ABSTRACT

A sealing structure for a rotary valve including a rotary member having a plurality of pockets opening toward the outer periphery of a rotary member. A casing encloses the outer peripnery of the rotary member. Sealing members are provided between the outer periphery of the rotary member and the inner periphery of the casing. The sealing members are adjustably projectable in the radial direction.

2 Claims, 13 Drawing Figures

SEALING STRUCTURE FOR ROTARY VALVES

The present invention relates to improvements in sealing structures between the outer periphery of a rotor and the inner periphery of a casing in a rotary valve especially for connecting two devices having a pressure difference between them and conveying powder particles or the like.

More particularly, the present invention relates to a sealing structure for rotary valves comprising a rotor which is a valve, and a casing enclosing the outer periphery of the rotor, sealing members provided between the outer periphery of said valve and the inner periphery of said casing being made adjustably radially projectable to project radially in response to their wear to make the sealing positive, to prolong their life, to make the sealing surface pressure uniform, and to be able to operate simply.

BACKGROUND OF THE INVENTION

Conventional rotary valves, viz., either of a type wherein a rotor is cylindrical and solid and has pockets, or of a type wherein a rotor is provided with radial blades, have several disadvantages. In particular, in the sealing parts on the sliding surface between the outer periphery of the rotary member and the inner periphery of the casing, if the valve is to convey powder particles, the powder particles will bite into the sliding surface, the wear will gradually increase due to the mutual friction, and the sealing performance will decrease greatly.

Therefore, in order to eliminate such disadvantages, there has been suggested a valve of a structure wherein sealing members such as packings formed of soft material, such as rubber, or sealing members formed of a wear-resisting metal are removably fitted to the outer peripheral part of the casing, or wherein sealing members are always resiliently pressed radially outwardly or inwardly with springs.

However, in readjusting the sealing surface pressures of such sealing members, the rotary valve must be disassembled, each sealing member must be adjusted, and the readjustment will entail complex operations. Further, it is difficult: to vary the sealing surface pressure of the sealing member to any pressure without disassembling the valve; to set and maintain the clearance in the sliding part of the sealing member to be precise; and to keep the clearance and sliding surface pressure of the sliding part of the sealing member always proper in conformity with the operating conditions of the apparatus. In the valve of the type wherein the sealing members are resiliently pressed with springs, there are disadvantages in that an extraordinary frictional force will act on the sealing member, the wear of the sealing member will increase sooner, and the life will be decreased. Further, in the valve of the type wherein springs are used, the spring load will vary (weaken) with the wear of the sealing member, the sealing surface pressure will vary, it will be difficult to perfectly correct for the wear, and the operations of disassembling and adjusting the valve at the time of readjusting the sealing surface pressure become more troublesome and complicated.

The present invention solves the foregoing disadvantages and problems.

SUMMARY OF THE INVENTION

The present invention provides a sealing structure for a rotary valve, including a rotary member provided with a plurality of pockets opening toward the outer periphery of the rotary member. A casing encloses the outer periphery of the rotary member. Sealing members are provided between the outer periphery of the rotary member and the inner periphery of the casing. The sealing members are formed to be adjustably projectable in the radial direction.

An object of the present invention is to provide a sealing structure for rotary valves for connecting two devices having a pressure difference between them and conveying powder particles or the like, wherein sealing members sealing the space between the inner periphery of the casing and the rotary member are made adjustably radially projectable.

An object of the present invention is to provide a sealing structure for rotary valves wherein, in case the sealing members are worn by the friction with the sliding surface and the biting of the conveyed powder particles into the surface, the sealing members will be projected by a projecting mechanism so as to be able to re-seal the valve simply by an external operation without disassembling the valve.

Another object of the present invention is to provide a sealing structure for rotary valves wherein: as the amount of the radial projection of the sealing members is made adjustable by an external operation, the sealing surface pressure can be readjusted and varied and a minute clearance in the sliding part of the sealing member can be set and maintained positively by a simple operation; the sealing member adjusting operation is easy; the performance is high; and the maintenance is reduced.

A further object of the present invention is to provide a sealing structure for rotary valves wherein: as the sealing members can be projected and adjusted in response to the wear so as to be readjustable, the sealing members can be used to the last while being effectively adjusted; the life of the sealing members can be prolonged; and, as the sealing members are projected, otherwise than by resiliently pressing them with springs, they will not be partially worn, the sealing surface pressure will not vary with the variation of the bulk load, and the performance is excellent.

In the present invention, the valve may be sealed by adjustably radially projecting sealing members through a projecting mechanism. In a rotary valve of a type provided with a rotary member having radial blades, a sealing member is provided radially projectably along each blade at the outer tip of the blade so as to be projected radially by an operating body fitted in the blade, and a driving adjusting means driving this operating body. An operating body, such as a push rod, is used and is driven by the axial sliding of a shaft member having conical surfaces. Alternatively, the operating body may be pressed and driven radially outwardly by fluid pressure, such as oil pressure or air pressure. Because the operating body is pressed and driven by the axial sliding of the shaft member or by the fluid pressure, it can be operated from outside the rotary valve.

In the type in which a cylindrical solid rotary member is provided with pockets, sealing members are provided projectably radially inward on the inside wall of the casing so as to be pressed radially inwardly. In this pressing means, bolts are screwed in from the outer peripheral side of the casing, are screwed and adjusted to be pressed radially inwardly to project the sealing members to be in contact with the outer periphery of the rotary member. In another means, the sealing members are pressed through operating bodies by fluid pressure, such as oil pressure or air pressure, so as to be in contact with the outer periphery of the rotary member. Therefore, the sealing members can be projected and readjusted simply by an entirely external operation.

DETAILED DESCRIPTION

Figure 1:
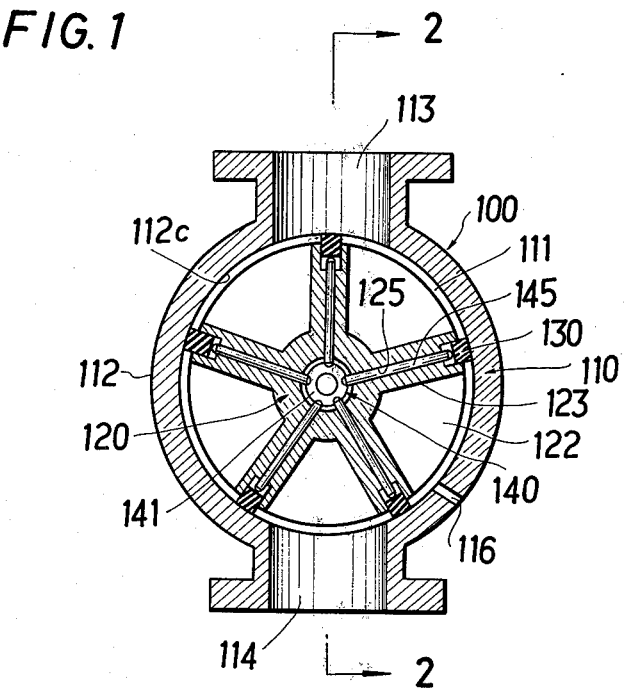
FIG. 1 is a vertical elevation section of a rotary valve of a type having blades.

In the first embodiment of the present invention, sealing members are made to be able to be pressed and projected radially outwardly as shown in FIGS. 1 to 5.

A rotary valve 100 consists of a casing 110 having a cylindrical chamber 111 and a rotary member 120 having many or, as in the illustration, five blades 123 disposed radially at regular angular intervals. An inlet 113 and outlet 114 are formed above and below, respectively, the casing 110 to communicate with the cylindrical chamber 111. A casing body 112 expands arcuately to the right and left of said inlet and outlet. A deaerating port 116 is made in a proper position in the rotating direction of the rotary member of casing body 112.

The rotary member 120 is rotatably contained in the chamber 111 by rotatably bearing a longitudinal shaft part 121 provided in the center part by means of bearings 115 in the front and rear plates 112a and 112b of the casing 110. Member 120 is provided with a plurality of, or as in the illustration, five pockets 122, each having a proper width, concaved toward the center to open radially outwardly, and partitioned by blades 123. A predetermined clearance is held between the outer tips of the blades 123, that is, the outer periphery of the rotary member 120 and the inner peripheral surface 112c of the body 112 of casing 110.

Figure 2:
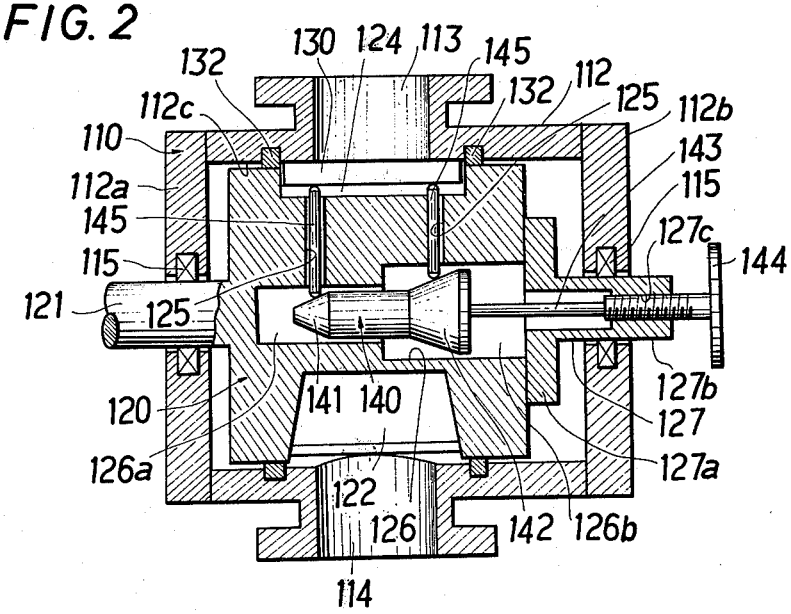
FIG. 2 is a sectioned view on line 2—2 in FIG. 1.
Figure 3:
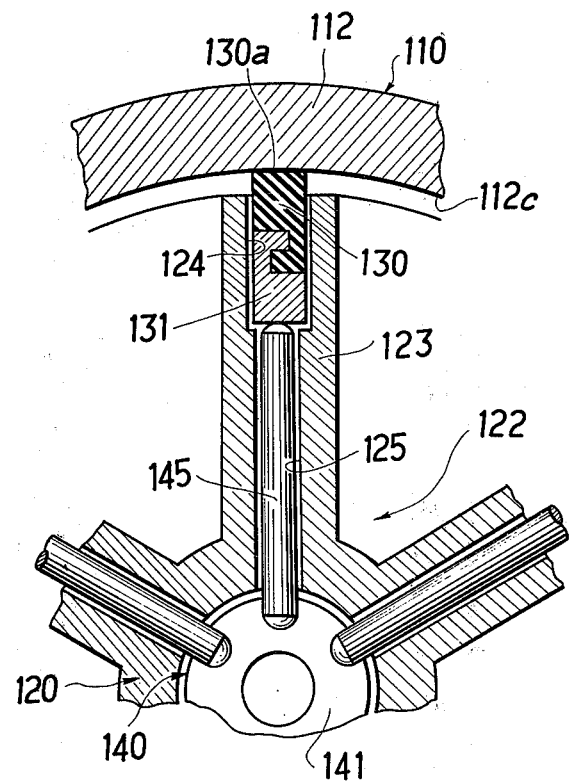
FIG. 3 is a magnified view of an essential part of FIG. 1.

As shown in FIGS. 1 and 2, a cavity 124 for containing a sealing member 130 having a proper length in the axial direction (width direction) and a proper depth toward the center is formed at the outer tip of each blade 123. The sealing member 130 is made of soft material, such as rubber, plastics, asbestos or animal or vegetable fibers, or of highly wear-resisting metal, such as soft steel, molybdenum steel, or stainless steel. The sealing member may be used as is, but can be used, as shown in FIG. 3, as lined on the surface opposite to the sliding surface with a holding member 131 made of a rigid body so as to be uniformly projected and to be used to the last without being wasted in case it is made of soft material, such as rubber.

A hole 126 is formed in the axial direction in the center part of the rotary member 120 and is closed at one end and opened at the other end. A tubular shaft member 127, acting as one side of the shaft 121, is removably secured through a flange part 127a on the end surface on the open side of the hole 126 of rotary member 120. The shaft part 127b of this member is extended out of the rear plate 112b of the casing. The hole 126 is formed longitudinally in two steps as a small diameter part 126a and large diameter part 126b. Long holes 125 are formed in the containing cavity 124 of each blade 123 from the respective hole parts 126a and 126b.

An adjusting shaft 140, having different diameter portions to fit the hole parts 126a and 126b, is slidably fitted in the hole 126. Shaft 140 is provided with a first truncated conical surface 141 of a small diameter in the small diameter part, and with a second truncated conical surface 142 of a large diameter ranging between the large diameter hole part and small diameter hole part. In the hole parts having the conical surfaces 141 and 142, the long holes 125 are formed to connect the containing cavity 124 with the interior of hole 126 to make them communicate with each other. Push rods 145, fitting respectively the inner ends of the long holes 125, are slidably fitted in the respective holes. Rods 145 are provided to slide in contact at their base ends with the conical surfaces 141 and 142, and are in contact at their outer tips with the bottom of the sealing member 130 fitted in the containing cavity 124. The adjusting shaft 140 is connected at its rear end with the tip of a screw shaft 143. Shaft 143 is threadedly engaged with a threaded part 127c provided in the end part of the shaft part 127b, and is extended through shaft part 127b of the tubular shaft member 127. Shaft 143 is provided with a handle 144 at the extended end.

In the drawings, the reference numeral 132 represents a side sealing member to seal the sealing member 130 on each side.

The rotary valve 100 is connected at inlet 113 with a high pressure feeding system of material, such as powder particles, and at outlet 114 with a conveying system or the like of the material of the next stage under a low pressure.

When the rotary member 120 rotates clockwise in FIG. 1, the material fed through the inlet will be contained in the pocket 122, will be sealed with the sealing members 130 at the tips of two blades 123 partitioning the pocket in sliding contact with the inner peripheral surface 112c of the casing body, will be deaerated and decompressed in the vicinity of the deaerating port 116, and will be discharged through outlet 114.

When sliding surface 130a of sealing member 130 is worn, the sliding surface pressure is to be varied under the operating condition, said pressure is to be readjusted, and the minute clearance between the sliding surface 130a and the inner peripheral surface 112c of the casing body is to be adjusted, the following steps will be taken.

When the handle 144 is rotated, the screw shaft 143 will rotate to advance forwardly, and the adjusting shaft 140 connected with screw shaft 143 at the tip will slide forwardly in the axial direction. The adjusting shaft 140 may be connected with screw shaft 143 so as to transmit no rotation, but to transmit only the axial movement and may be set only to slide.

With the advance of the adjusting shaft, the conical surfaces 141 and 142 will also advance, and the push rods 145 will be guided by the tapered conical surfaces so as to be pushed radially outwardly. As a result, the sealing members 130 contained in containing cavities 124 at the tip of blades 123 will be projected radially outwardly by the push rods to adjust the pressure and clearance in the sliding part. Thus, by operating the outside handle, the sealing members 130 can be projected radially outwardly to be adjusted. The operation is easy, it is not necessary at all to disassemble the casing 110, and the adjustment can be made positively.

Figure 4:
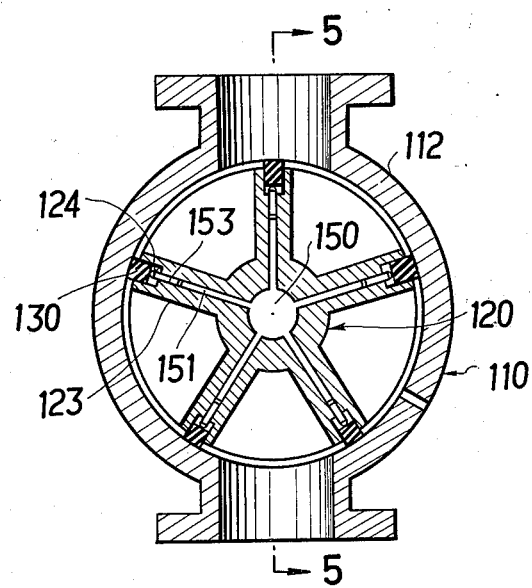
FIG. 4 is a view similar to FIG. 1, showing a modified embodiment of FIG. 1.
Figure 5:
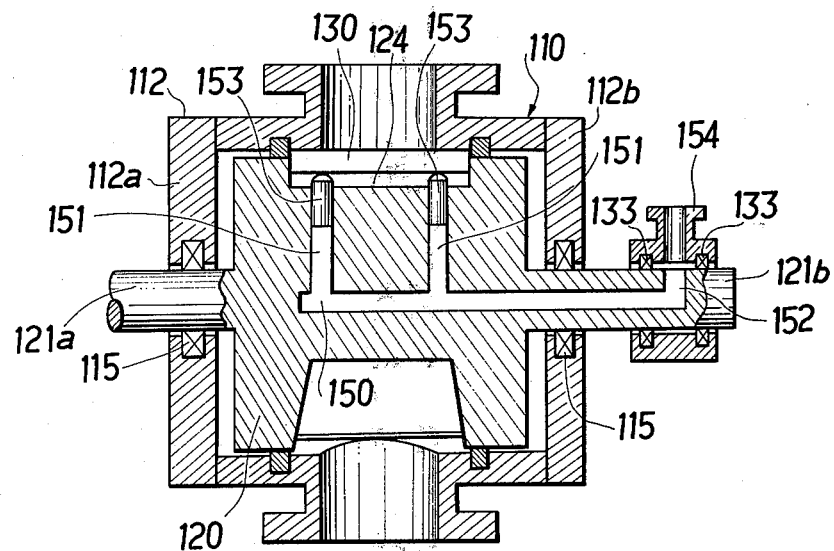
FIG. 5 is a sectioned view on line 5—5 in FIG. 4.
Figure 6:
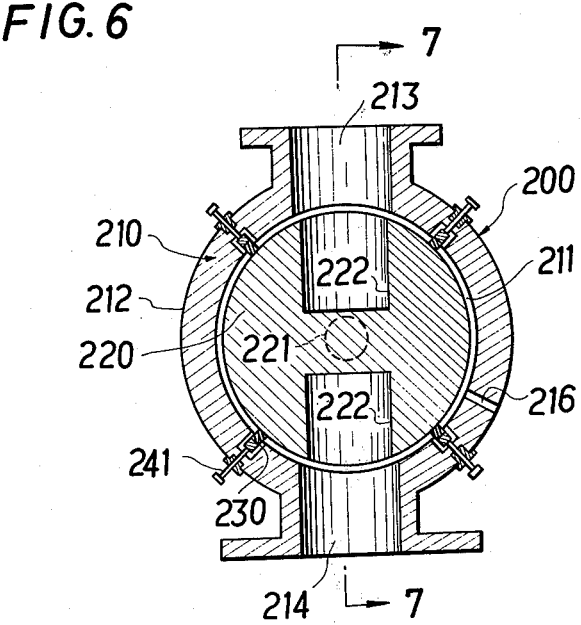
FIG. 6 is a vertical elevation section of a rotary valve of a type having few pockets.

FIGS. 4 and 5 show a modified embodiment wherein fluid pressure is used for the sealing member 130 projecting mechanism. In the drawings, the same reference numerals are given to the same corresponding parts as mentioned above.

Supporting shafts 121a and 121b, provided respectively in front and rear of the center part of a rotary member 120, are formed integrally with member 120, are borne through bearings 115 in the front and rear plates 112a and 112b, respectively, of body 112 of casing 110, and are extended out. A first passage 150, closed at both ends, is provided in the axial direction in the center part in rotary member 120 including the rear shaft 121b. Two auxiliary passages 151 are provided between passage 150 and the cavity 124 containing the sealing member 130 of each blade 123. Piston-shaped pushing members 153 are slidably fitted in auxiliary passages 151. The passage 150 is extended to the outside extension of the supporting shaft 121b and is connected at its rear end with a communicating passage 152 opening in a part of the outer periphery of the shaft 121b. A rotary joint 154, sealed with sealing members 133, is provided in the part having the communicating passage 152, and is connected with a fluid feeding device, such as an oil pressure power unit (not shown). The pressure receiving areas of the piston-shaped pushing members 153 are set to be the same, so that the sealing member 130 projecting pressure may be the same.

When the fluid feeding device is operated, the generated fluid pressure, such as an oil pressure, will be fed to passage 150 through the rotary joint 154, and will press the pushing members 153 fitted in auxiliary passage 151 to project the sealing members 130 radially outwardly.

When the sealing members 130 are projected by the fluid pressure, such as an oil pressure or air pressure, to maintain the same pressure, the above-mentioned adjustment will be able to be made simply and externally, and the projection of the sealing members and the sliding surface pressure will be able to be easily controlled.

FIGS. 6 to 13 show another embodiment of the present invention. In this embodiment, sealing members are made free to project on the outer periphery of a rotary member out of the inside wall of a casing and are on the fixed side.

FIGS. 6 to 9 show an embodiment in which bolts are used as projection adjusting members. The reference numeral 210 indicates a casing of a rotary valve 200. In a cylindrical space 211, formed within the casing, a rotary member 220 is rotatably borne by a shaft 221 which is extended out forwardly and rearwardly. Shaft 221 is borne by bearings 215 in the front and rear plates 212a and 212b of the casing 210. An inlet 213 and outlet 214 are formed above and below, respectively, the body 212 of the casing. A deaerating port 216 is formed in the arcuate peripheral wall part of the body.

Pockets 222, opening on the outer periphery at angular intervals of 180°, are formed in the rotary member 220.

Figure 9:
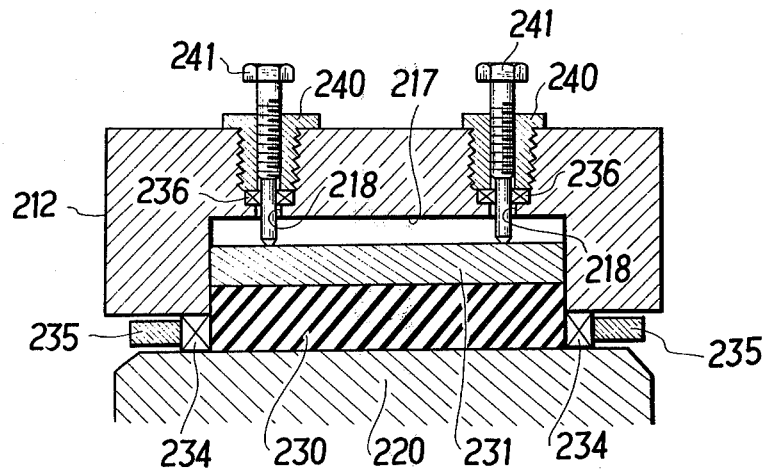
FIG. 9 is a sectioned view on line 9—9 in FIG. 8.

Sealing members 230 are disposed in cavities 217 formed on the inner peripheral wall 212c of the casing body 212. The sealing members 230 are disposed over a proper length in the axial direction of the inner peripheral wall 212c, and over a proper depth outwardly in the radial direction as shown in FIG. 9. The sealing member 230 is slidably fitted in cavity 217, and is supported on its outer surface by a holding member 231. Four of such cavities 217 are radially provided at angular intervals of 90°.

Holes 218, connecting cavity 217 with the outer periphery, are provided in the outer peripheral portion of the casing body, are made with larger diameter in the portion near the outer periphery, and are opened on the outer periphery. A female screw 218a is formed on the inner periphery of the large diameter portion of each hole 218. A fitting nut 240, having a female screw 240a formed on its inner periphery and a male screw 240b formed on its outer periphery, is threaded with female screw 218a. A bolt is screwed with nut 240 so as to be an adjusting rod 241. A sealing member 236 is inserted at the lower end of the nut 240 to seal the adjusting rod from outside. Adjusting rod 241 is kept in contact at its tip with a surface of holding member 231 fitted in containing cavity 217.

A side seal, which is a seal between the front or rear side surface of rotary member 220 and the inner peripheral wall 212c of casing body 212, i.e., a seal in the axial direction of the rotary member, will be described hereinbelow.

Figure 7:
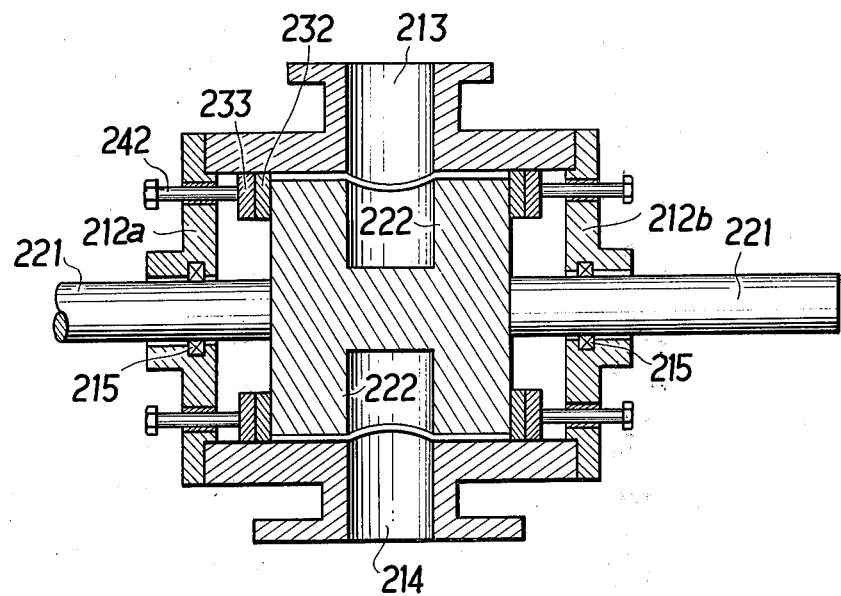
FIG. 7 is a sectioned view on line 7—7 in FIG. 6.
Figure 8:
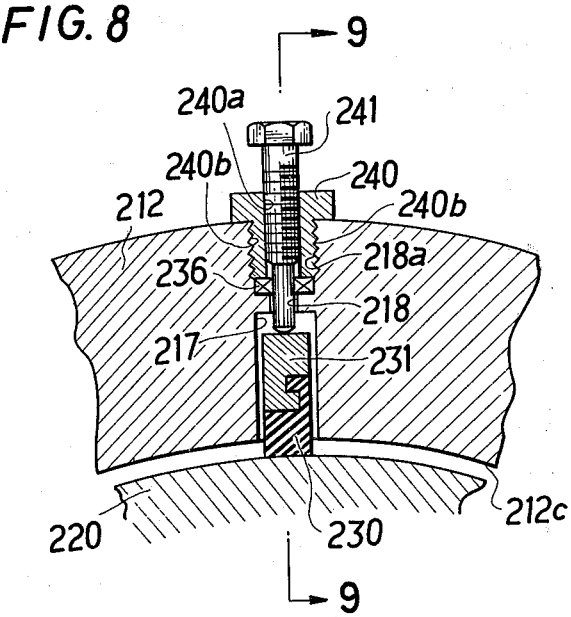
FIG. 8 is a magnified view of an essential part of FIG. 6.

As shown in FIG. 7, a sealing member 232 is formed to be ring-shaped to be in contact on the outer peripheral surface with the inner peripheral wall 212c, and to be of a radial width sufficient to cover the axial end surface of the rotary member 220. Member 232 is supported on the back surface by a holding member 233 which, in turn, is supported by contact with the tips of adjusting rods 242. Rods 242 consist of a plurality of bolts provided radially through the front or rear wall 212a or 212b of the casing body so as to be free to be screwed and advanced from outside to press sealing member 232 against the axial end surface of rotary member 220. These sealing members 232, pressing the axial end surfaces or rotary member 220, will press both end surfaces of the peripheral sealing members 230 where they are made to be of a length equal to the axial length of the rotary member.

In the embodiment shown in FIG. 9, the sealing members 230 are formed to be rather longer than the openings of the pockets 222 on the periphery of the rotary member 220 so as to sufficiently seal said openings. A packing 234 is inserted through a spacer 235 between the side sealing member 232 and sealing member 230 as a side seal.

If the peripheral sealing member 230 is worn or the sliding surface pressure of the sealing member 230 is to be adjusted, the adjustment will be made by the following operation.

When adjusting rods 241 are screwed and rotated from outside to advance toward the center in the radial direction, the sealing member 230 will be projected out of cavities 217 through the holding members 231 in contact with the tips of the adjusting rods 241 so as to be pressed on the periphery of rotary member 220. As sealing members 230 are projected by rods 241 in two right and left positions in the axial direction as shown in FIG. 9, they can be uniformly projected. Thus, by the operation from the outside of valve 200, the sealing surface pressure in the peripheral direction of the rotary member can be readjusted, varied or adjusted, and the worn sealing members can be adjusted simply without disassembling the casing. This operation is very easy.

When rods 242, projected in front and rear of the casing body 212, are screwed and rotated, the side sealing members 232 will advance in the axial direction so as to be able to be adjusted simply by the same very easy operation as is mentioned above.

Figure 10:
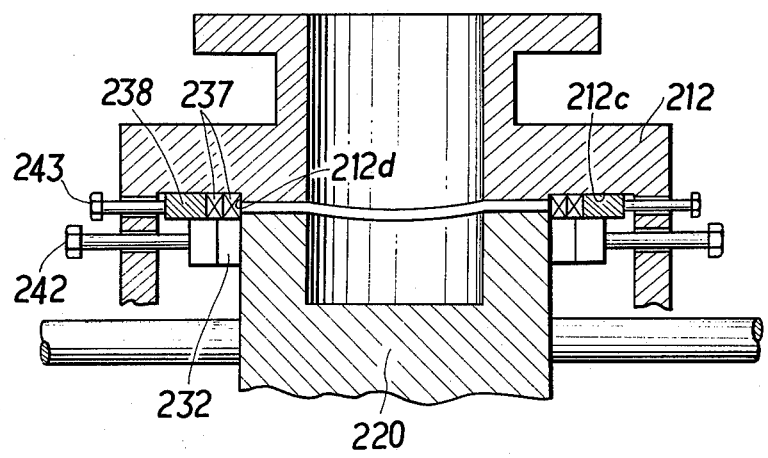
FIG. 10 is a magnified view of an essential part of a modified embodiment of a side seal shown in FIG. 7.

FIG. 10 shows a modified embodiment of the side seal shown in FIG. 7. A ring-shaped packing 237 is inserted to be ring-shaped between the outer periphery of side sealing member 232, and the inner peripheral surface 212c of casing body 212. Packing 237 is held by a holding member 238, and is adjustably pressed against a step part 212d made on the inner peripheral surface 212c of casing body 212 in the outer peripheral side part of the end surface of rotary member 220 with the tips of adjusting rods 243 provided separately from rods 242.

Figure 11:
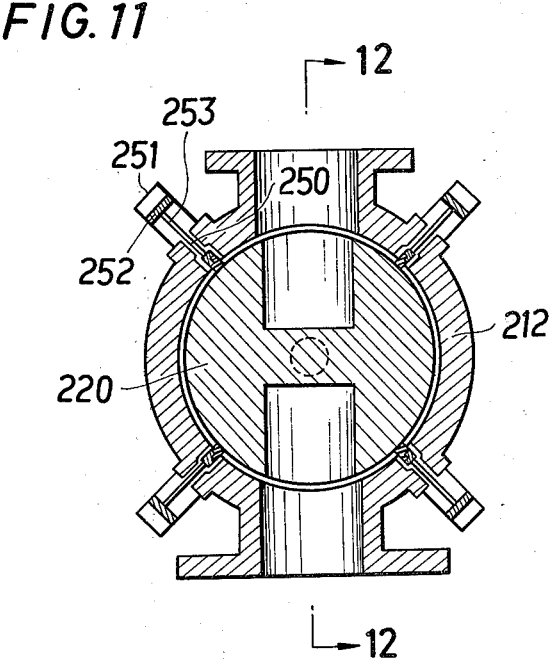
FIG. 11 is a vertical elevation section showing a modified embodiment of FIG. 6.
Figure 13:
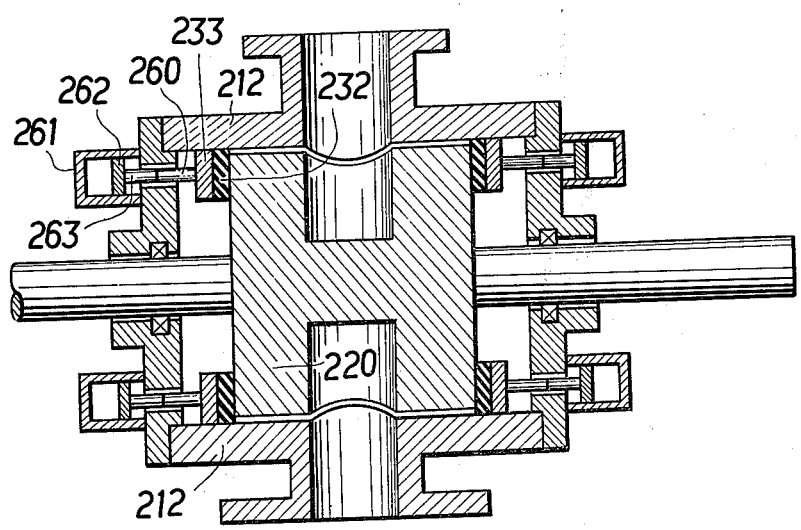
FIG. 13 is a sectioned view of an embodiment wherein the side seal is made adjustable with oil pressure.
Figure 12:
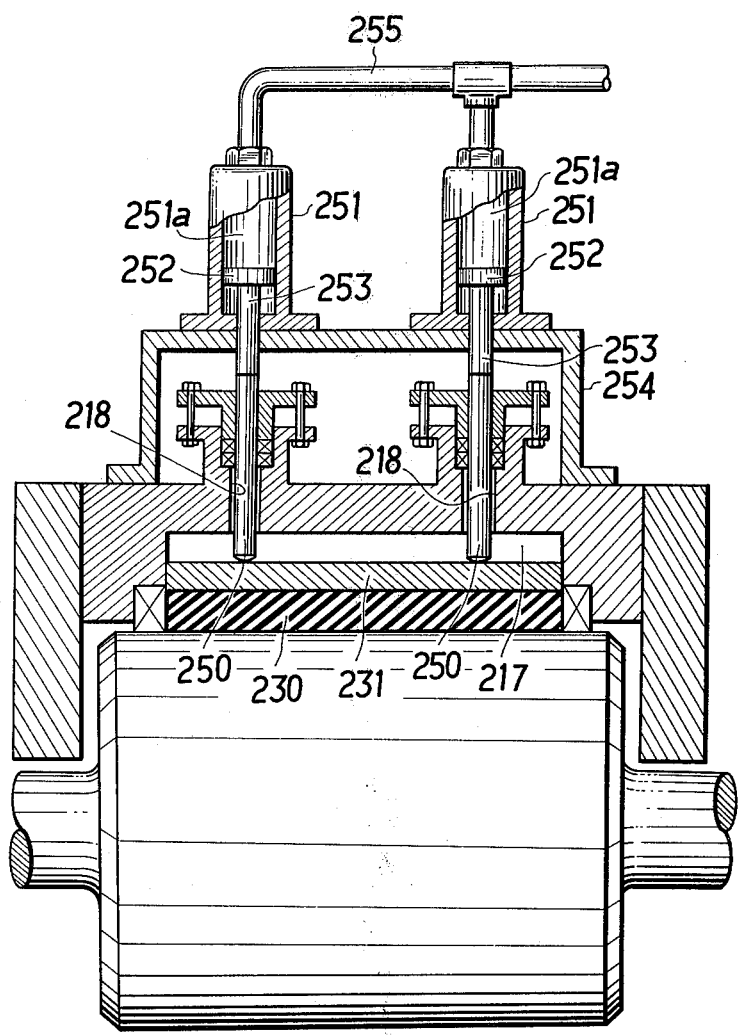
FIG. 12 is a magnified sectioned side view of an essential part of a sealing part of FIG. 11.

FIGS. 11 to 13 show an embodiment wherein the above-mentioned sealing members are adjusted with fluid pressure, such as oil or air pressure.

In the drawings, the same reference numerals are given to the same corresponding parts as are mentioned above.

As shown in FIGS. 11 and 12, adjusting rods 250, pressing the sealing member 230 and holding member 231 contained in cavity 217 formed on the inner peripheral surface 212c of casing body 212, are slidably provided in holes 218 communicating with the outside. Rods 253 of pistons 252 of cylinder devices 251 provided in the outer peripheral portion of the casing body are kept in contact with the outward extended end parts of rods 250. Adjusting rod 250 and cylinder device 251 are assembled, and provided through a fitting member 254 extending in the axial direction of the outer peripheral part of casing body 212. Cylinder chambers 251a are connected with each other through a common piping 255. When fluid pressure is made to act through piping 255, the pistons 252 will slide in the advancing direction to project sealing members 230 through piston rods 253 and rods 250, and to press them against the outer peripheral surface of rotary member 220. The projection of sealing members 230 and the sliding surface pressure can be readjusted and varied freely by controlling the fluid pressure.

FIG. 13 shows an embodiment wherein the side sealing member 232 and holding member 233 in FIG. 7 are made so as to be adjusted with fluid pressure, such as oil pressure.

Rods 260, pressing holding member 233, are made to slide by piston rods 263 of cylinder devices 261 fitted with pistons 262. Devices 261 are provided on the front and rear plates 212a and 212b of casing body 212. Rods 260 act the same as rods 242 so that the side seals of rotary member 220 may be adjusted.

According to the present invention, the sealing members which are worn can be adjusted, and the sliding surface pressure can be readjusted and varied, without disassembling the rotary valve, by very simple outside operations.

In accordance with the invention, the material to be conveyed is not limited to powder particles, but may be fluid or the like.

We claim:

1. A sealing structure for a rotary valve, comprising:
a rotary member provided with a plurality of pockets opening toward the outer periphery of said rotary member;
a casing enclosing the outer periphery of said rotary member;
sealing members provided between the outer periphery of said rotary member and the inner periphery of said casing;
said sealing members being formed to be adjustably projectable in the radial direction;
radial blades partitioning and separating said plurality of pockets provided in said rotary member;
cavities in the outer tips of said blades;
said sealing members being slidably fitted in said cavities to be pressed to project outwardly in the radial direction of said rotary member;
a supporting shaft for said rotary member;
a rod member disposed in one end of said supporting shaft;
a hole formed in the axial direction at the center of said rotary member;
an adjusting member slidably fitted in said hole and advanced and retreated in the axial direction by said rod member advanced and retreated as operated from outside at said one end of said supporting shaft of said rotary member;
said cavities being connected with said hole through passages provided radially within said blades; and
pushing members slidably fitted in said passages to be in contact at one end thereof with the back surface side of said sealing member and at the other end thereof with said adjusting member so that the sealing members may be projected by said pushing members through the sliding of said adjusting member.

2. A sealing structure according to claim 1, wherein:
said pushing members comprise push rods; and
said adjusting member is provided with a plurality of conical surfaces in said axial direction, and is made to slide so that said sealing members may be pressed on the back surface side by said push rods which slide in contact at one end thereof with one of said conical surfaces to project said sealing members radially outwardly.

* * * * *

UNITED STATES PATENT AND TRADEMARK OFFICE
CERTIFICATE OF CORRECTION

PATENT NO. : 4,180,188
DATED : December 25, 1979
INVENTOR(S) : Tatuo AONUMA, Michio KIUCHI, Hirozi WATANABE and Takeshi AKAO It is certified that error appears in the above-identified patent and that said Letters Patent are hereby corrected as shown below:

On the title page, left column, after "[73] Assignee:", change "Kokkoman Shoyu Co., Ltd." to --Kikkoman Shoyu Co., Ltd.--.

Signed and Sealed this

Eighteenth Day of August 1981

[SEAL]

Attest:

*Attesting Officer*

GERALD J. MOSSINGHOFF

*Commissioner of Patents and Trademarks*